(12) United States Patent
De Aquino et al.

(10) Patent No.: US 7,789,588 B2
(45) Date of Patent: Sep. 7, 2010

(54) SUBSEA SYSTEM PROVIDED WITH A CONTROLLABLE CURVATURE FLEXIBLE PIPE

(75) Inventors: Roberto Jourdan De Aquino, Rio de Janeiro (BR); Jean Paul Ferraz, Rio de Janeiro (BR); Fred Laaf, Niteroi (BR); Carlos Silveira, Rio de Janeiro (BR); Mario A. Vignoles, Rio de Janeiro (BR)

(73) Assignee: Technip France (FR)

( * ) Notice: Subject to any disclaimer, the term of this patent is extended or adjusted under 35 U.S.C. 154(b) by 100 days.

(21) Appl. No.: 11/997,851

(22) PCT Filed: Jul. 27, 2006

(86) PCT No.: PCT/FR2006/001836

§ 371 (c)(1),
(2), (4) Date: Mar. 20, 2008

(87) PCT Pub. No.: WO2007/017574

PCT Pub. Date: Feb. 15, 2007

(65) Prior Publication Data

US 2008/0317555 A1 Dec. 25, 2008

(30) Foreign Application Priority Data

Aug. 4, 2005 (FR) .................................. 05 08324

(51) Int. Cl.
*F16L 1/20* (2006.01)
*E21B 12/00* (2006.01)

(52) U.S. Cl. .................. 405/216; 405/168.2; 405/195.1; 166/367

(58) Field of Classification Search .............. 405/168.2, 405/195.1, 211, 216, 224.2, 224.3; 166/243, 166/346, 367
See application file for complete search history.

(56) References Cited

U.S. PATENT DOCUMENTS

| 4,570,716 A | 2/1986 | Genini et al. |
| 5,738,464 A | 4/1998 | Delrieu |

(Continued)

FOREIGN PATENT DOCUMENTS

EP       1213522       11/2005

(Continued)

OTHER PUBLICATIONS

International Search Report and Written Opinion in French dated Jan. 17, 2007, issued in corresponding PCT Application No. PCT/FR2006/001836 filed Jul. 27, 2006.

(Continued)

*Primary Examiner*—Tara Mayo-Pinnock
(74) *Attorney, Agent, or Firm*—Ostrolenk Faber LLP

(57) ABSTRACT

A curvature limiter for a hydrocarbon transferring subsea system comprising a flexible tubular member through which an intermediate portion of the flexible hydrocarbon pipe passes. The flexible tubular member has a plurality of successive, substantially cylindrical sections which are hingedly mounted with respect to each other. At a predetermined maximum displacement thereof, the tubular member defining a mean plane in such a way that the flexible tubular member forms a mean curvature having the predetermined curvature radius of this mean plane.

11 Claims, 2 Drawing Sheets

U.S. PATENT DOCUMENTS

| | | |
|---|---|---|
| 6,148,921 A | 11/2000 | Valla et al. |
| 6,276,456 B1 | 8/2001 | Head |
| 2006/0177273 A1* | 8/2006 | Bonnemaire et al. ........ 405/211 |
| 2007/0196179 A1* | 8/2007 | Baghernejad ............... 405/170 |
| 2008/0087435 A1* | 4/2008 | Reddy ........................ 166/343 |
| 2008/0131210 A1* | 6/2008 | Wajnikonis ................. 405/211 |

FOREIGN PATENT DOCUMENTS

| | | | |
|---|---|---|---|
| FR | 2 538 444 | | 6/1984 |
| FR | 2 739 167 | | 3/1997 |
| FR | 2 748 293 | | 11/1997 |
| FR | 2 817 941 | | 6/2002 |
| GB | 2404428 A | * | 2/2005 |
| WO | WO 95/18907 | | 7/1995 |
| WO | WO 99/66169 | | 12/1999 |

OTHER PUBLICATIONS

International Search Report in English dated Jan. 17, 2007 issued in corresponding PCT Application No. PCT/JP2006/001836.

* cited by examiner

SUBSEA SYSTEM PROVIDED WITH A CONTROLLABLE CURVATURE FLEXIBLE PIPE

CROSS REFERENCE TO RELATED APPLICATION

The present application is a 35 U.S.C. §§371 national phase conversion of PCT/FR2006/001836, filed 27 Jul. 2006, which claims priority of French Application No. 0508324, filed 4 Aug. 2005. The PCT International Application was published in the French language.

BACKGROUND OF THE INVENTION

The present invention relates to a subsea system for transferring hydrocarbons between a seabed system and a surface system.

These subsea systems comprise at least one flexible pipe which extends in a catenary between the seabed system and the surface system. However, when the water is deep, the flexible pipe then exerts considerable tensile stresses on the seabed system. In order to distributed these tensile stresses, the flexible pipe is attached by suspending an intermediate portion from a buoy which is held between the seabed and the surface, by an anchoring line anchored in the seabed.

However, the holding of this intermediate pipe portion tends to form an angular point and, in order to reduce this deformation which is prejudicial to the state of the pipe, the pipe is placed on a curvature limiter. This curvature limiter consists merely of a rounded support on which the pipe rests, and it is the curvature limiter that is integral with the buoy. Reference may be made, in particular, to document U.S. Pat. No. 5,505,560 which describes a curvature limiter of this type which in this case itself rests on the buoy.

A drawback of this device consists, in particular, in its overall size which increases the time required to implement the flexible pipe when it is deposited from a pipe-laying vessel at the surface. This is because the device cannot be lowered into the water through the shaft provided in the vessel for lowering the pipe. In addition, this type of device is relatively expensive to produce.

A problem that then arises and that the present invention seeks to solve is to propose a system that not only facilitates laying of the flexible pipe but that is also inexpensive.

SUMMARY OF THE INVENTION

In order to solve this problem and according to a first aspect, the present invention proposes a subsea system for transferring hydrocarbons between a seabed system and a surface system, said subsea system comprising a flexible pipe extended in a catenary between said seabed system and said surface system, said subsea system further comprising a buoy and a curvature limiter for holding an intermediate portion of said flexible pipe suspended between the seabed and the surface and preventing the curvature of said intermediate portion from being below a given radius of curvature; according to the invention, said curvature limiter comprises a flexible tubular member into which said intermediate portion is slipped, said flexible tubular member comprising a plurality of successive substantially cylindrical portions, articulated relative to one another with a predetermined maximum displacement, and said cylindrical portions of said plurality of cylindrical portions can be driven relative to one another to their predetermined maximum displacement defining a mean plane in such a way that said tubular member forms, substantially in said mean plane, a mean curvature having said given radius of curvature.

Thus, one feature of the invention consists in the implementation of a flexible tubular member into which there is slipped the pipe whereby the tubular member is therefore capable of being preinstalled around the pipe and then unwound with the pipe. There is therefore no need to provide the fitting and the attachment of a bulky curvature limiter during installation. In addition, a flexible tubular member of this type, which is thus carried in its operative position when the flexible pipe is fully installed and the buoy is connected to the intermediate pipe portion, is relatively inexpensive to implement.

According to a particularly advantageous embodiment of the invention, said plurality of substantially cylindrical portions comprise sleeves which are set apart from one another, which substantially surround the pipe and which are connected end to end by annular members which partially cover these sleeves. In this way, as the tubular members are limited in their displacement over the sleeves, the sleeves are themselves successively limited in their displacement relative to one another.

Advantageously, said sleeves each have a cylindrical body and two mutually symmetrical ends closed off by a flange forming two facing first shoulders. Preferably, said annular members, which are capable of receiving said flanges on the inside, each have two mutually symmetrical ends which are curved radially inward to form two facing second inner shoulders and two mutually opposing second outer shoulders. In this way, two consecutive sleeves can be connected by an annular member in such a way that the two respective flanges of the two facing extended sleeves can be fitted in the annular member and that the two first shoulders of the two sleeves are able to rest respectively against the two second inner shoulders. Furthermore, a sleeve is connected to two consecutive annular members, a flange being inside each annular member, in such a way that the two opposing second outer shoulders of the two respective annular members are capable of resting against each other, between the two first shoulders of said sleeve. Thus, as will readily be understood, when the intermediate flexible pipe portion, which is slipped into the tubular member, bends in said mean plane, the second inner shoulders of the annular members tend to rest against the first shoulders of the sleeves, toward the outside of the curvature, whereas conversely, toward the inside of the curvature, the second shoulders of the annular members tend for their part respectively to abut one another. In this way, as the predetermined maximum displacement is achieved in the same direction by all of the sleeves and all of the annular members, the tubular member therefore defines at an arc, the radius of curvature of which is minimal and, by the same token, limits the intermediate pipe portion at this same curvature.

Furthermore and preferably, said buoy is held between the seabed and the surface by an anchoring line anchored in said seabed, the buoy exerting in this case a stress which is oriented toward the surface at the end of the anchoring line and which provides support for the flexible pipe in the region of the intermediate portion. According to a preferred embodiment of the invention, said buoy is mounted around said tubular member. Moreover, according to another preferred embodiment, said tubular member is provided with a central collar which is located in a median position on the tubular member and to which said buoy can be attached. Moreover, the central collar is mounted axially in a fixed position on the tubular member and, according to a variation, it is mounted directly on the flexible pipe so as to surround it, and the tubular member is divided into two parts extending on either side of the tubular member to which they are connected. Thus, the central collar and the tubular member are mounted in a fixed position on the intermediate flexible pipe portion.

Moreover, as said tubular member has two mutually opposing ends, said opposing ends are held close to each other, for example by means of a cable braced along a chord, when said tubular member forms said mean curvature. Thus, the flexible pipe is held in a fixed position along this mean curvature in a simple manner and at an advantageous cost.

Moreover and particularly advantageously, said opposing ends are respectively extended by bending stiffeners allowing the displacement movements of the flexible pipe still to be controlled beyond the tubular member and on either side, so as to reduce fatigue deterioration of the pipe. According to another variation, said opposing ends are respectively extended by frustoconical tubular means which are capable of limiting the displacement movements of said pipe; said pipe then rests against a frustoconical inner wall of the frustoconical tubular means.

According to another aspect, the present invention proposes a method for implementing a subsea system as defined hereinbefore, said flexible pipe having a seabed part located upstream of said intermediate portion and a surface part located downstream, and said surface system having a lowering shaft and, according to said method, said seabed part is unwound from said surface system through said lowering shaft, locking to the intermediate portion; said intermediate portion, which is located on said surface system, is then provided with said tubular member; said surface part is then unwound through said lowering shaft, said intermediate portion, which is provided with said tubular member, therefore passing through said lowering shaft; said intermediate portion, which is provided with said tubular member, is attached to said buoy; and the opposing ends of the tubular member are drawn together in order to drive said cylindrical portions relative to each other to their predetermined maximum displacement in such a way that said tubular member forms said mean curvature.

In this way, there is no need to provide a second surface system which is capable of supporting a voluminous and bulky curvature limiter of the type of those of the prior art, which is attached to the intermediate portion while the flexible pipe is being lowered, since this intermediate portion, which is provided with the tubular member according to the invention and is not yet curved, is sufficiently straight to be slipped through the lowering shaft.

Other particularities and advantages of the invention will emerge on reading the description provided hereinafter of particular embodiments of the invention, given by way of example but without entailing limitation, with reference to the appended drawings, in which.

Figure 1:
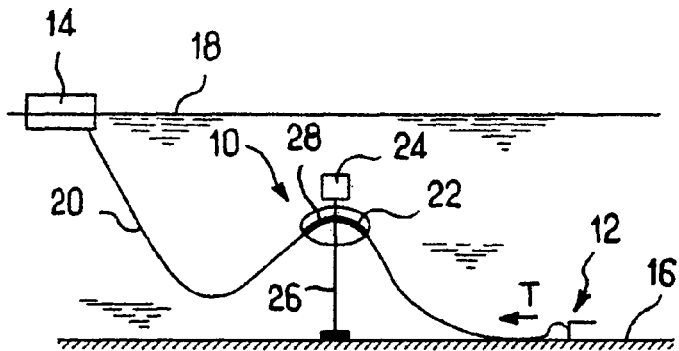
FIG. 1 is a schematic view of a subsea system according to the invention.

FIG. 1 illustrates schematically a subsea system 10 allowing the transfer of hydrocarbon between a seabed system 12 and a surface system 14. The seabed system 12 rests on a seabed 16 and allows the extraction of hydrocarbons contained in a layer located below this seabed 16, whereas the surface system 14 floats on a surface 18 of the marine environment above said layer. The seabed system 12 and the surface system 14 are connected by a flexible pipe 20 which allows the hydrocarbons to be transferred from the seabed system 12 to the surface system 14. In order to reduce, on the one hand, the tensile stresses T exerted by the flexible pipe 20 both on the seabed system 12 and on the surface system 14 and, on the other hand, the strains exerted on the flexible pipe itself, which is subjected to the action of its own weight, an intermediate pipe portion 22 is held suspended between the seabed 16 and the surface 18 owing to a buoy 24 which is held between the seabed 16 and the surface 18 by means of an anchoring line 26 anchored carefully in the seabed 16. The buoy 24 is sufficiently bulky to exert, for example, a tensile force equivalent to at least 30 tons. Furthermore, the intermediate portion 22 is slipped into a curvature limiter consisting of a flexible tubular member 28 which can limit the curvature of the suspended flexible pipe 20 and thus preserve it. This is because the greater the curvature of the flexible pipe 20, the more marked the reduction in its diameter and the greater the increase in pressure inside the pipe, at a constant flow rate, thus increasing the strains associated with the hydrocarbons and, accordingly, the risks of deterioration.

The flexible tubular member 28 will now be described in greater detail with reference to FIGS. 2 to 3.

Figure 2:
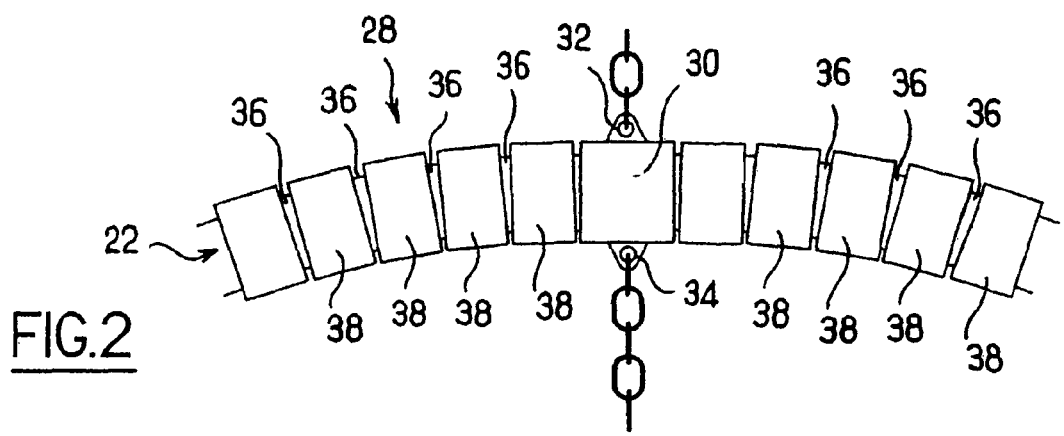
FIG. 2 is a detailed schematic view of an element illustrated in FIG. 1.

FIG. 2 is a partial view of the flexible tubular member 28 into which the intermediate portion 22 is slipped. Furthermore, the flexible tubular member 28 has a central collar 30 located in a median part of the tubular member 28 with which it is integral and which is intended to be attached in its upper part 32 to the buoy 24 and in its lower part 34 to the anchoring line 26.

The flexible tubular member 28 consists of sleeves 36 which are arranged end to end and joined respectively together by annular members 38 which are also arranged end to end and partially surround the sleeves 36. As will be described with reference to FIG. 3, the sleeves 36 are articulated in the annular members 38 at a predetermined maximum displacement, thus allowing the radius of curvature of the flexible tubular member 28 to be limited.

Figure 3:
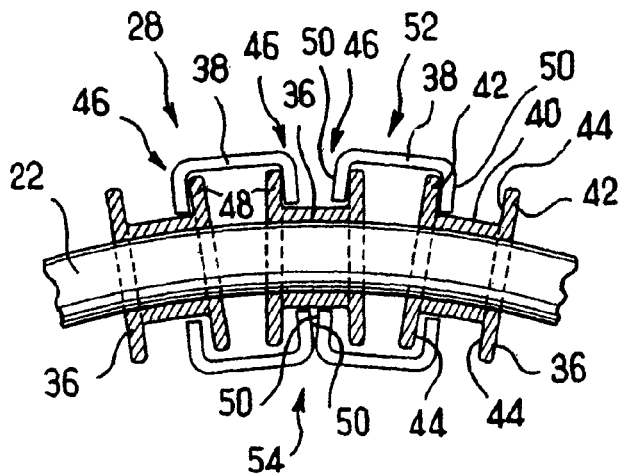
FIG. 3 is a detailed schematic view in longitudinal section of the element illustrated in FIG. 2.

This figure, FIG. 3, is a partial longitudinal section of the tubular member 28, showing in this case three sleeves 36 which are spaced uniformly from one another and into which the flexible pipe 22 is slipped. The three sleeves 36 are in this case connected in pairs by two annular members 38, allowing the mode of operation of the curvature limiter to be illustrated.

The sleeves 36 each have a main body 40, which surrounds the flexible pipe 22, and two mutually symmetrical opposing ends each closed off by a free flange 42. The free flanges 42 thus define facing first shoulders 44. Furthermore, the sleeves 36 are respectively joined together by the annular member 38 which caps the two flanges 42 of two consecutive sleeves 36. For this purpose, the circularly symmetrical annular member 38 has a diameter at least equal to that of the free flanges 42 and it is curved radially inward and toward the main body 40 at each of its ends 46 in order precisely to trap the flanges 42. However, the main body 40 of the sleeves 36 is translationally movable in the curved ends 46. The annular member 38 therefore defines two facing inner shoulders 48 and two mutually opposing outer shoulders 50. Moreover, the axial distance separating the two flanges 42 of a single sleeve is substantially equal to the distance separating the two curved ends 46 of an annular member 38.

Thus, when the flexible pipe 22 tends to bend under the effect of its weight along a mean plane of curvature, which is in this case that of the plane of FIG. 3, into the part outside the curvature 52, the inner shoulders 48 of the annular members 38 rest against the first shoulders 44 of the sleeves 36, whereas in the diametrically opposite inner part of the curvature 54 the outer shoulders 50 of the annular members 38 abut one another. As a result, the sleeves 36 are respectively driven in displacement in the annular members 38 to their predetermined maximum amplitude in such a way that the flexible pipe 22 is extended along a maximum mean curvature in which its radius of curvature is, for its part, at a minimum value.

Moreover, as will readily be understood, the flexible pipe 22, which is in this case bent, is liable to be curved freely in an opposite direction or even straightened.

Reference will now be made to FIGS. 4A to 6 in order to describe particular embodiments of the invention.

Figure 4A:
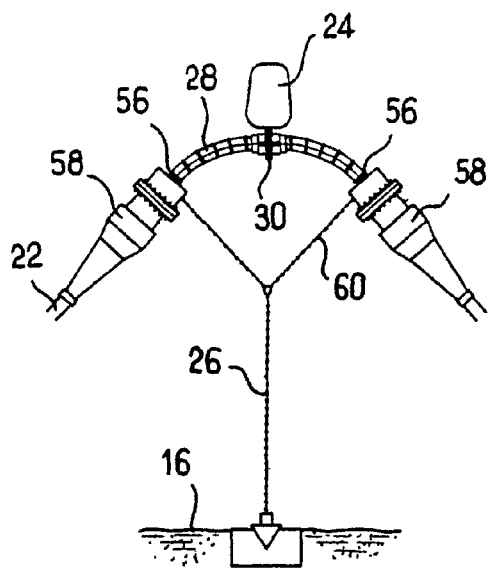
FIG. 4A is a detailed schematic view of the system illustrated in FIG. 1 according to a first particular embodiment.

FIG. 4A shows an intermediate flexible pipe portion 22 slipped into the tubular member 28 which, for its part, has a central collar 30 connected to a buoy 24. Moreover, the tubular member 28 has two ends 56 respectively extended by two bending stiffeners 58 for controlling the curvature of the flexible pipe 22 beyond and in the vicinity of the intermediate portion 22. The bending stiffeners 58 consist of a frustoconical sleeve which is made of flexible material, for example polyurethane, and prevents excessive curvature of the flexible pipe 22 when the tubular member 28 is withdrawn. Furthermore, the two ends 56 of the tubular member 28 are joined together by a flexible link 60, for example a cable or a chain, or else by a rigid link according to another variation, the length of which is, for example, substantially equal to twice the radius of curvature of the mean curvature of the intermediate portion 22, the flexible link 60 being for its part attached, in its environment, to the anchoring line 26. In this way, the intermediate portion 22 of the flexible pipe 20 is held along a mean curvature owing to the buoy 24 which tends to drive the median part of the tubular member 28 toward the surface 18, whereas the flexible link 60 is divided into two parts corresponding to two radii of the substantially circular mean curvature.

Figure 4B:
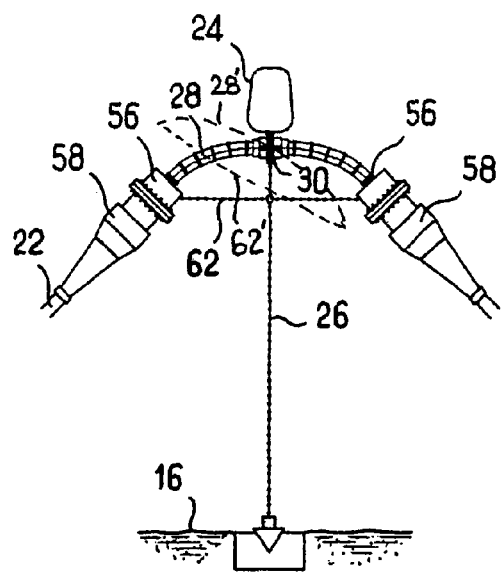
FIG. 4B is a detailed schematic view of the system according to a second particular embodiment.

According to a second particular embodiment illustrated in FIG. 4B, the flexible link is replaced by a rectilinear link 62 which connects the two ends 56 of the tubular member 28 along a chord of the mean curvature of the tubular member 28, the central collar 30 being in this case directly attached to the anchoring line 26. Thus, the tubular member 28 is held in a fixed position of mean curvature. In a variation in which the rectilinear link 62 intersects the anchoring line 26 without being connected thereto by a connection ring, the curved tubular member 28 is capable of pivoting freely outside a horizontal plane, substantially about an axis intersecting the central collar 30, between the buoy 24 and the anchoring line 26 when, for example, the surface system is substantially set apart from its original position. FIG. 4B outlines the positions 28' and 62' assumed in this case by the tubular member 28 and the rectilinear link 62.

Figure 5:
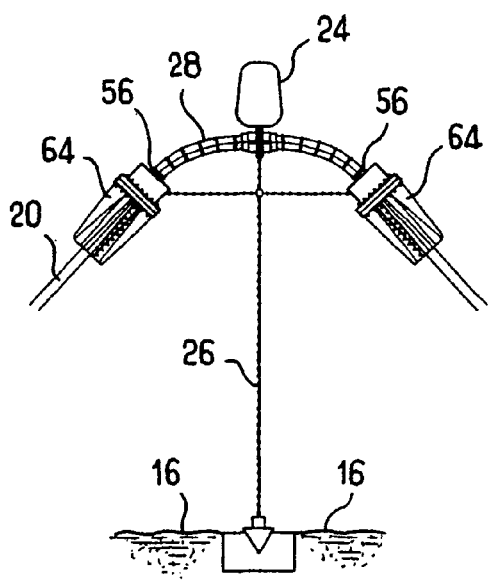
FIG. 5 is a detailed schematic view of the system according to a third particular embodiment.
Figure 6:
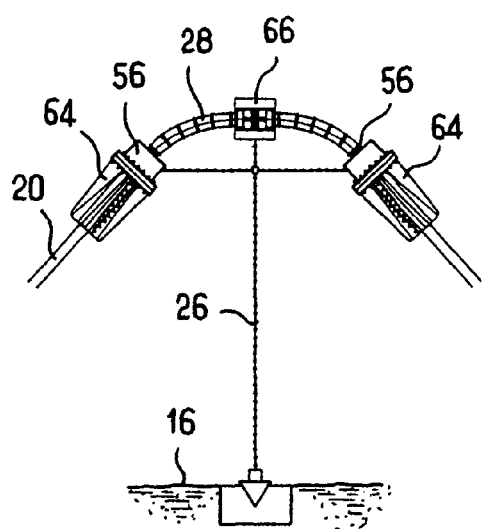
FIG. 6 is a detailed schematic view of the system illustrated in FIG. 1 according to another variation.

According to a third embodiment illustrated in FIG. 5 including in part the configuration illustrated in the preceding figure, FIG. 4B, the tubular member 28 is in this case extended at its two ends 56 by frustoconical bellmouth means 64 which extend by flaring from the ends 56, and in the vicinity thereof, around the flexible pipe 20. In this way, the flexible pipe 20 is limited in its displacement when the tubular member 28 is withdrawn.

Furthermore, according to one variation including in part the configuration illustrated in the preceding figure, FIG. 5, the buoy is no longer attached to the central collar 30, although it does consist of an annular sleeve 66 forming a tight chamber around the median part of the tubular member 28. Obviously, the internal volume of the chamber delimited by the annular sleeve 66 is equivalent to the internal volume of the aforementioned buoys 24.

Moreover, the present invention also proposes a method for implementing a subsea system according to the invention. The flexible pipe 20 is generally prewound and carried on a surface system, for example a pipe-laying vessel, and it is then unwound to form the system. Pipe-laying vessels generally have a tower which is provided with tensioners which are in line with a lowering shaft and allow the flexible pipe to be unwound in the seabed, guiding the pipe through the lowering shaft. Thus, a part of the pipe is unwound down to an intermediate portion at which provision is made to attach the anchoring line 26 and the buoy 24. On the pipe-laying vessel, the intermediate portion is equipped with the tubular member 28, then this equipped intermediate portion is guided through the lowering shaft in order then to unwind the remainder of the flexible pipe.

Moreover, when the tubular member 28 has passed sufficiently far through the lowering shaft, or even more precisely below the vessel, the intermediate portion, which is provided with said tubular member, is attached to the buoy 24 and to the anchoring line 26 via the central collar 30. Then, the curvature of the tubular member 28 is formed by holding the ends 56 of this tubular member 28 close to each other, for example by means of a cable.

The invention claimed is:

1. A subsea system for transferring hydrocarbons between a seabed system at a seabed and a surface system at a sea surface, said subsea system comprising:

a flexible pipe extended in a catenary between said seabed system and said surface system, said pipe having an intermediate portion;

a curvature limiter operable for holding an intermediate portion of said flexible pipe suspended between said seabed system and said surface system and for preventing curvature of said intermediate portion from being below a given radius of curvature;

said curvature limiter comprising a flexible tubular member having two opposite ends, said intermediate portion of said pipe being in said flexible tubular member, said flexible tubular member comprising a plurality of successive substantially cylindrical portions, articulated relative to one another with a predetermined maximum displacement by articulation;

a link joining said two opposite ends of said tubular member to hold said ends to cause the curvature of said intermediate portion of said flexible pipe, said plurality of cylindrical portions being driven relative to one another to their predetermined maximum displacement defining a mean plane in such a way that said tubular member is held in a fixed position of mean curvature substantially in said mean plane, wherein said mean curvature has said given radius of curvature; and a buoy connected to said curvature limiter and operable to raise it above the seabed.

2. The subsea system as claimed in claim 1, wherein said plurality of substantially cylindrical portions comprise sleeves and annular members connecting said sleeves end to end.

3. The subsea system as claimed in claim 2, wherein each said sleeve has two mutually symmetrical opposite ends each end having a flange, forming two facing first shoulders.

4. The subsea system as claimed in claim 1, further comprising an anchoring line connected for holding said buoy between the seabed and the surface by said anchoring line anchored in said seabed.

5. The subsea system as claimed in claim 1, wherein said buoy is mounted around said tubular member.

6. The subsea system as claimed in claim 1, further comprising a central collar around said tubular member to which said buoy is attached.

7. The subsea system as claimed in claim 1, further comprising bending stiffeners at said opposite ends of said tubular member for extending said opposite ends.

8. The subsea system as claimed in claim 1, further comprising frustoconical devices at said opposite ends of said tubular member for extending said opposite ends and also being operable for limiting displacement movements of said pipe.

9. A subsea system for transferring hydrocarbons between a seabed system at a seabed and a surface system at a sea surface, said subsea system comprising:
   a flexible pipe extended in a catenary between said seabed system and said surface system, said pipe having an intermediate portion;
   a curvature limiter operable for holding an intermediate portion of said flexible pipe suspended between said seabed system and said surface system and for preventing the curvature of said intermediate portion from being below a given radius of curvature;
   said curvature limiter comprising a flexible tubular member having two opposite ends, said intermediate portion of said pipe being in said flexible tubular member,
   said flexible tubular member comprising a plurality of successive substantially cylindrical portions, articulated relative to one another with a predetermined maximum displacement by articulation, said plurality of cylindrical portions being driven relative to one another to their predetermined maximum displacement defining a mean plane in such a way that said tubular member is held in a fixed position of mean curvature substantially in said mean plane, wherein said mean curvature has said given radius of curvature; and
   a buoy connected to said curvature limiter and operable to raise it above the seabed;
   wherein said plurality of substantially cylindrical portions comprise sleeves and annular members connecting said sleeves end to end, each said sleeve having two mutually symmetrical opposite ends each end having a flange, forming two facing first shoulders, and
   wherein each said annular member has two mutually symmetrical opposite ends which are curved radially inward to form two facing second inner shoulders and two opposing second outer shoulders.

10. A method for implementing a subsea system wherein the system comprises a flexible pipe having a seabed part located upstream of an intermediate portion of said pipe and a surface part located downstream of said intermediate portion of said pipe opposite said seabed part, and a surface system for delivering said pipe subsea and having a lowering shaft,
   the method comprising the following steps:
   lowering said seabed part from said surface system through said lowering shaft;
   providing said intermediate portion of said pipe with a tubular member on said intermediate portion while said intermediate portion is located on said surface system;
   then lowering said intermediate portion provided with said tubular member through said lowering shaft
   attaching said intermediate portion which has been provided with said tubular member to a buoy; and
   linking opposite ends of said tubular member together by a link to hold them to each other,
   wherein said cylindrical portions are driven relative to each other to a predetermined maximum displacement such that said tubular member forms a mean curvature of said intermediate portion of said pipe.

11. The method of claim 10, wherein said flexible pipe is wound on a reel before said lowering and said lowering includes unwinding said pipe before lowering it.

* * * * *